United States Patent [19]

Akamatsu et al.

[11] Patent Number: 5,310,110

[45] Date of Patent: May 10, 1994

[54] HEATING APPARATUS AND HEATING POWER CONTROL METHOD

[75] Inventors: Yoshio Akamatsu, Nara; Misugi Yagi, Kyoto; Mitsuo Yokohata, Habikino; Yoshisato Wakashima, Sakurai; Mitsuo Ikeda, Yamatokoriyama, all of Japan

[73] Assignee: Matsushita Electric Industrial Co., Ltd., Osaka, Japan

[21] Appl. No.: 111,736

[22] Filed: Aug. 25, 1993

Related U.S. Application Data

[63] Continuation of Ser. No. 50,996, Apr. 22, 1993, abandoned, which is a continuation of Ser. No. 884,004, May 18, 1992, abandoned.

[30] Foreign Application Priority Data

May 17, 1991 [JP] Japan ................................. 3-113203

[51] Int. Cl.⁵ .......................... A47J 27/00; F23N 1/08; F24C 3/00
[52] U.S. Cl. .................................. 236/20 A; 99/331; 99/337; 99/344; 126/39 G
[58] Field of Search ..................... 99/329 R, 330, 331, 99/337, 338, 344, 403, 410, 417; 126/39 G, 374; 219/449, 494, 497; 236/20 A

[56] References Cited

U.S. PATENT DOCUMENTS

| | | | |
|---|---|---|---|
| 2,862,667 | 12/1958 | Hillebrand | 236/20 A |
| 3,668,372 | 6/1972 | Russell | 236/20 A |
| 4,492,336 | 1/1985 | Takata et al. | 126/39 G |
| 4,646,963 | 3/1987 | Delotto et al. | 236/20 A |
| 4,700,052 | 10/1987 | Wolf et al. | 219/497 |
| 4,741,261 | 5/1988 | DiMaria | 99/403 |
| 4,828,166 | 5/1989 | Wolf et al. | 99/331 |
| 4,869,233 | 9/1989 | Stulen et al. | 126/374 |
| 5,078,048 | 1/1992 | Yoshino et al. | 99/331 |
| 5,096,116 | 3/1992 | Akamatu et al. | 236/20 A |
| 5,103,801 | 4/1992 | Herring et al. | 99/331 |

FOREIGN PATENT DOCUMENTS

| | | |
|---|---|---|
| 0093179B1 | 11/1983 | European Pat. Off. . |
| 0146406B1 | 6/1985 | European Pat. Off. . |
| 59-95047 | 5/1984 | Japan . |
| 60-150717 | 7/1985 | Japan . |
| 0118321 | 5/1990 | Japan ................. 236/20 A |

Primary Examiner—Timothy F. Simone
Attorney, Agent, or Firm—Wenderoth, Lind & Ponack

[57] ABSTRACT

A heating apparatus by heating cooking materials in a water contained pan includes a heating device and an electronic circuit which controls the heating device. The temperature of the pan is detected, and the temperature rise characteristics of the pan contents are detected from when heating the pan starts until the contents boils. The quantity of the contents being cooked is determined from the temperature rise characteristics at a relatively low temperature range. The type, such as the size of the contained solids, of the contents being cooked is determined at a relatively high temperature range near the boiling point. The heat output of the heating device is then regulated based on these determinations according to the selected cooking operation after the materials boil, and the cooking apparatus thus provides automated cooking control.

19 Claims, 12 Drawing Sheets

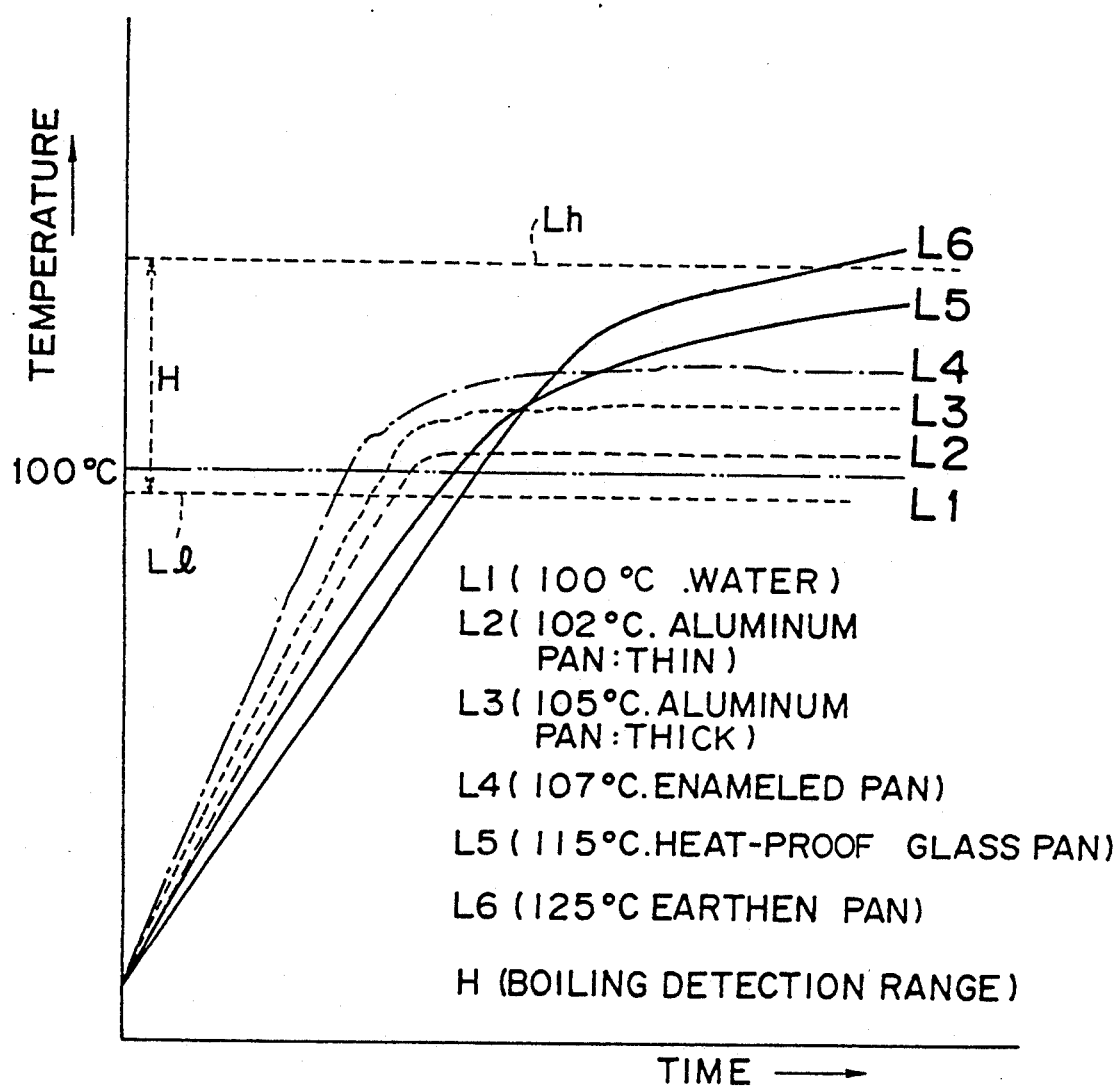

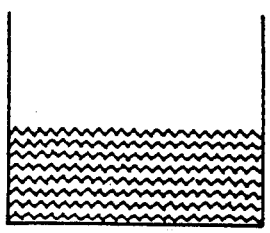
Fig. 9A
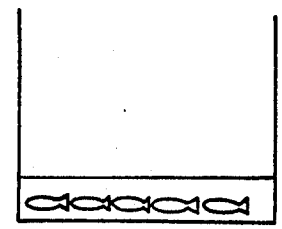
Fig. 9B
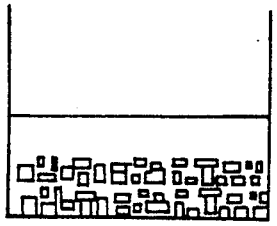
Fig. 9C
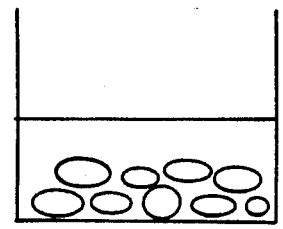
Fig. 9D
Fig. 10
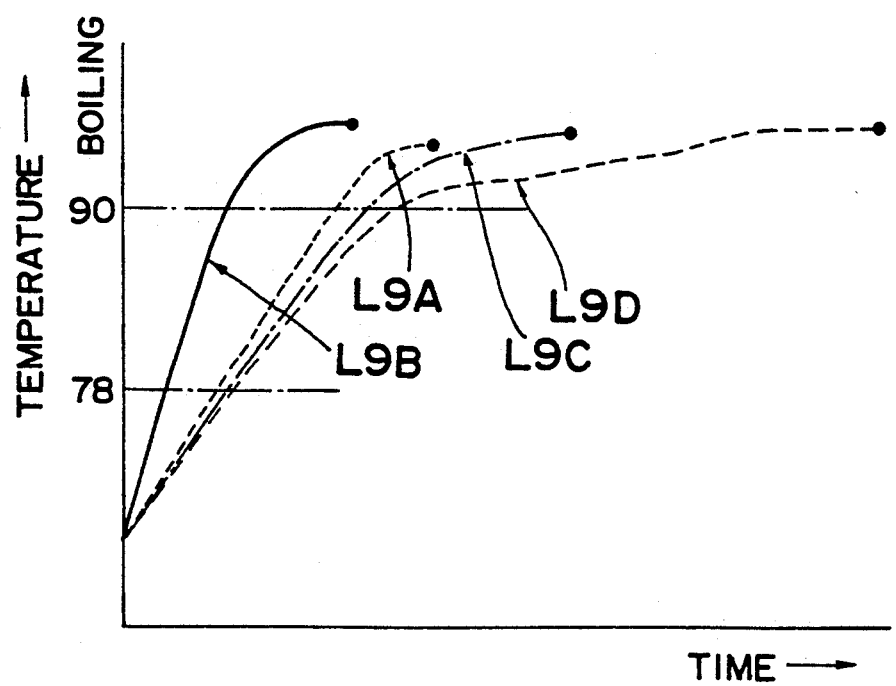

HEATING APPARATUS AND HEATING POWER CONTROL METHOD

This application is a continuation of now abandoned appliction, Ser. No. 08/050,996, filed on Apr. 22, 1993, which is in turn, a continuation of now abandoned application Ser. No. 07/884,004, filed May 18, 1992.

BACKGROUND OF THE INVENTION

1. Field of the Invention

The present invention relates to a device and method for controlling heating power for cooking providing convenient and safe cooking and, more particularly, to a cooking apparatus which automatically evaluates the quantity and content of cooking material containing moisture and controls the heat amount applied to the cooking material.

2. Description of the Prior Art

In FIGS. 13 and 14, a conventional gas cooking range is described below. As shown in FIG. 13, an example of conventional cooking apparatus Rc includes a control panel 101, a burner 102, a grate 103, a burner control knob 104, a pan bottom temperature sensor 105 for detecting a temperature at a bottom of a pan (not shown), and an ignition/shut-off button 106.

The control panel 101 has a plurality of cooking mode keys which are prepared for performing predetermined and preferable cooking procedures for the desirable cooking materials. For example, a boil key is operated to heat the contents within the pan until it boils and automatically turns the burner off once the contents boils, and a simmer key is to operated to heat the contents of the pan until it boils and then automatically lowers the burner to a lower heat setting and activates the shut-off timer to cause the contents to simmer for the preset time. To cook using the automatic control feature of the cooking range Rc, a user selects any of cooking mode keys and presses the ignition/shut-off button 106 to start the burner 102.

In FIG. 14, the heating operation of the conventional gas range Rc when the simmer mode is performed is shown. The temperature rise da per unit time dt is calculated from the time when the pan bottom sensor 105 detects a temperature of 78° C. to monitor the magnitude of the increase in the temperature gain da and thereby determine the quantity of water in the pan. The estimated boiling point KA is determined according to the temperature rise da. After the estimated boiling point KA is reached, the boiling point fp is detected by comparing the temperature rise da1, da2 and so on per unit time to the expected increase in temperature for each water volume to determine when the water boils. Since it is considered that the water in the pan is boiling when the boiling point fp is detected, the caloric output of the burner 102 is then reduced to a constant level to cook the contents of the pan.

By maintaining the burner 102 at a constant caloric output, however, the total caloric output tends to be either too much or not enough depending upon the quantity and type of foods being cooked, and this control feature is therefore not really practical for everyday use. Thus, it is not practical to apply only one kind of constant caloric output after reaching the boiling point fp to the various kinds of cooking materials because the quantity and type of cooking materials also vary at cooking time.

Furthermore, in the conventional gas range Rc, a temperature 13° C. above the boiling point fp is defined as a burning prevention point fg at which temperature the cooking material will burn. When the detected pan bottom temperature reaches the burning prevention point fg, the burner 102 is automatically turned off to prevent the cooking material from burning by an automatic over-heating suppression (burning prevention) device incorporated in the conventional gas cooking range Rc. Depending upon the heat conductivity of the pan as determined by the type and thickness of material used in the pan, and the contents of cooking material in the pan, specifically how much moisture is included in the cooking material, using a constant temperature rise of 13° C. from the boiling point fp to determine the burning prevention point fg tends to result in burnt foods when the moisture content is low. On the other hand, if the burning prevention point fg is set at much below a temperature 13° C. above the boiling point fp, the automatic over-heating suppressing device functions before the contents are fully cooked. It is therefore not practically possible to set the threshold temperature for the over-heating suppression function at less than a 13° C. rise from the boiling point fp.

Controlling the over-heating suppression function at a single temperature as a burning point makes it difficult to maintain a consistent level of doneness due to the heat conductivity of the pan as determined by the type and thickness of the material used in the pan and the amount of moisture in the pan.

SUMMARY OF THE INVENTION

The object of the present invention is therefore to provide a heating power control method and cooking apparatus which solve these problems.

The present invention has been developed with a view to substantially solve the above described disadvantages and has for its essential object to provide an improved heating power control method and cooking apparatus.

In order to achieve the aforementioned objective, a heating apparatus for heating material in a vessel containing water by heating the vessel comprises: a heating means for heating the vessel; a temperature detection means for detecting the temperature of the vessel; a first temperature change detection means for detecting a first temperature gradient of the detected temperature while the temperature of the vessel is in a first temperature range below a predetermined temperature; a quantity determining means for determining the quantity of the materials based on the detected temperature gradient and producing a quantity factor indicative of the quantity, a boiling maintained temperature determining means for determining a boiling maintained temperature based on the detected temperature gradient, a second temperature change detection means for detecting a second temperature gradient of the detected temperature while the temperature of the vessel is in a second temperature range above the predetermined temperature and below the detected boiling maintained temperature, a material determining means for determining the material of the heating materials based on the second temperature gradient and for producing a material factor indicative of the heating material, and a heating control means for controlling the heat quantity of the heating means according to the quantity factor and the material factor.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 8 is a graph showing the pan bottom temperature curves of the gas cooking range shown in FIG. 1 as the contents in the pan are boiled;

FIGS. 9A to 9D are graphs schematically illustrating cooking materials placed in the pan to be cooked by the gas cooking range shown in FIG. 1;

FIG. 10 is a graph showing the pan bottom temperature curves as different contents illustrated in FIGS. 9A to 9D are boiled;

DETAILED DESCRIPTION OF THE PREFERRED EMBODIMENTS

Figure 1:
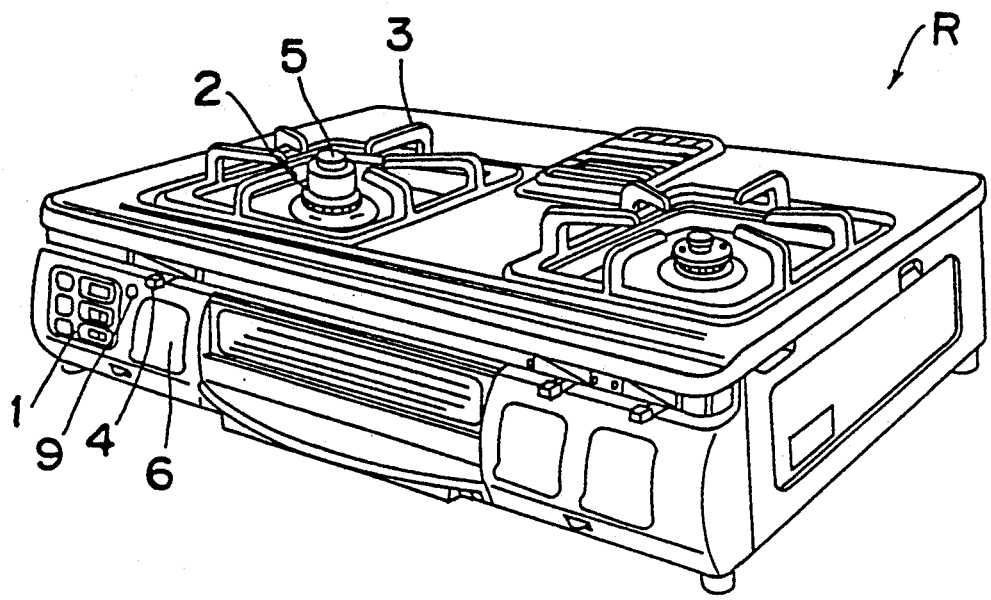
FIG. 1 is an oblique frontal view of a gas cooking range according to the present invention.

Referring to FIG. 1, an oblique frontal view of a gas cooking range according to the present invention is shown. A gas cooking range R includes a control panel 1, a burner 2, a grate 3, a burner control knob 4, a pan bottom temperature sensor 5 for detecting a temperature at a bottom of a pan (not shown), an ignition/shut-off button 6, and a warning lamp 9 for indicating the warning.

Figure 7:
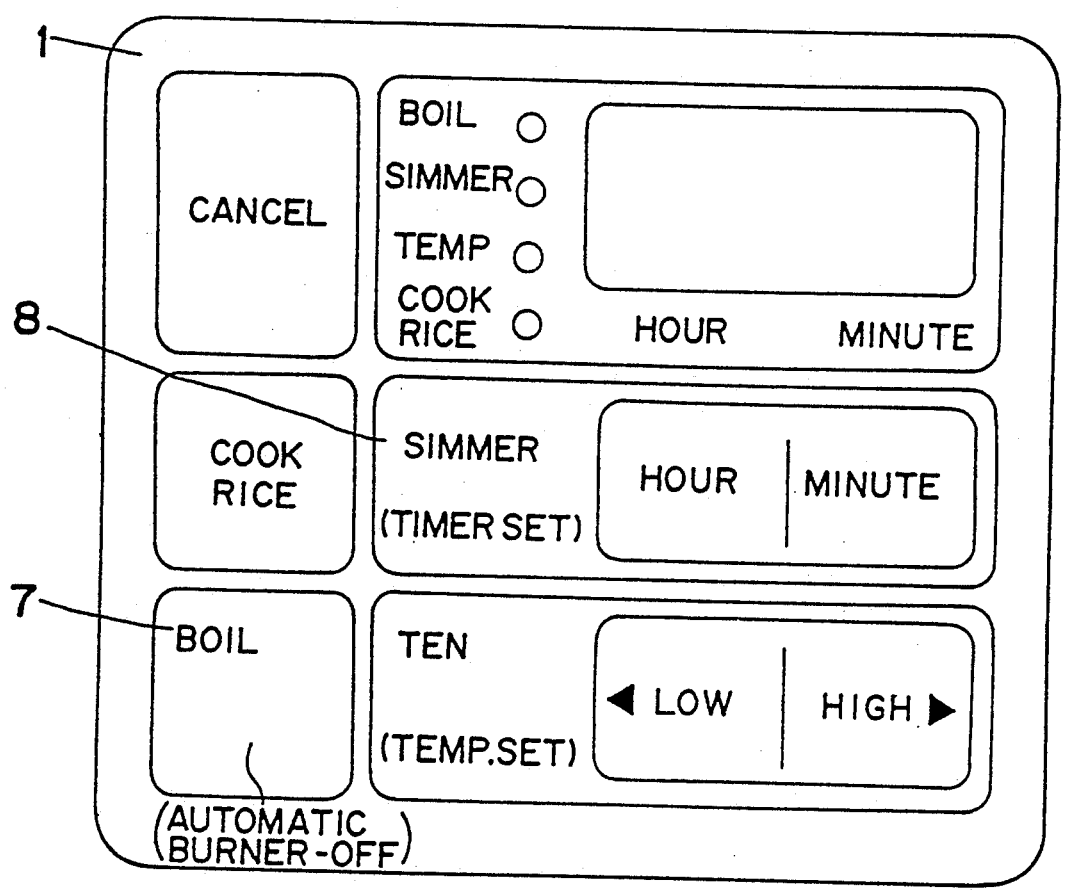
FIG. 7 is an enlarged view of the control panel of the gas cooking range shown in FIG. 1.

Referring to FIG. 7, a control panel 1 of the gas cooking range R is shown. The control panel 1 has a plurality of cooking mode keys which are operated for performing predetermined and preferable cooking procedures for the desirable cooking materials as shown in FIG. 7. For example, a boil key 7 is provided to cause the contents within the pan t boil and to automatically turn the burner off once the contents boils. A simmer key 8 is provided to cause the contents of, the pan to boil and thenafter automatically lower the burner to lower heat setting and activate the, shut-off timer (which the user may also preset) to cause the contents to simmer for the preset time. To cook the material using the automatic control feature of the cooking range R, a user selects one of the cooking mode keys and presses the ignition/shut-off button 6 to start the burner 2.

Figure 2:
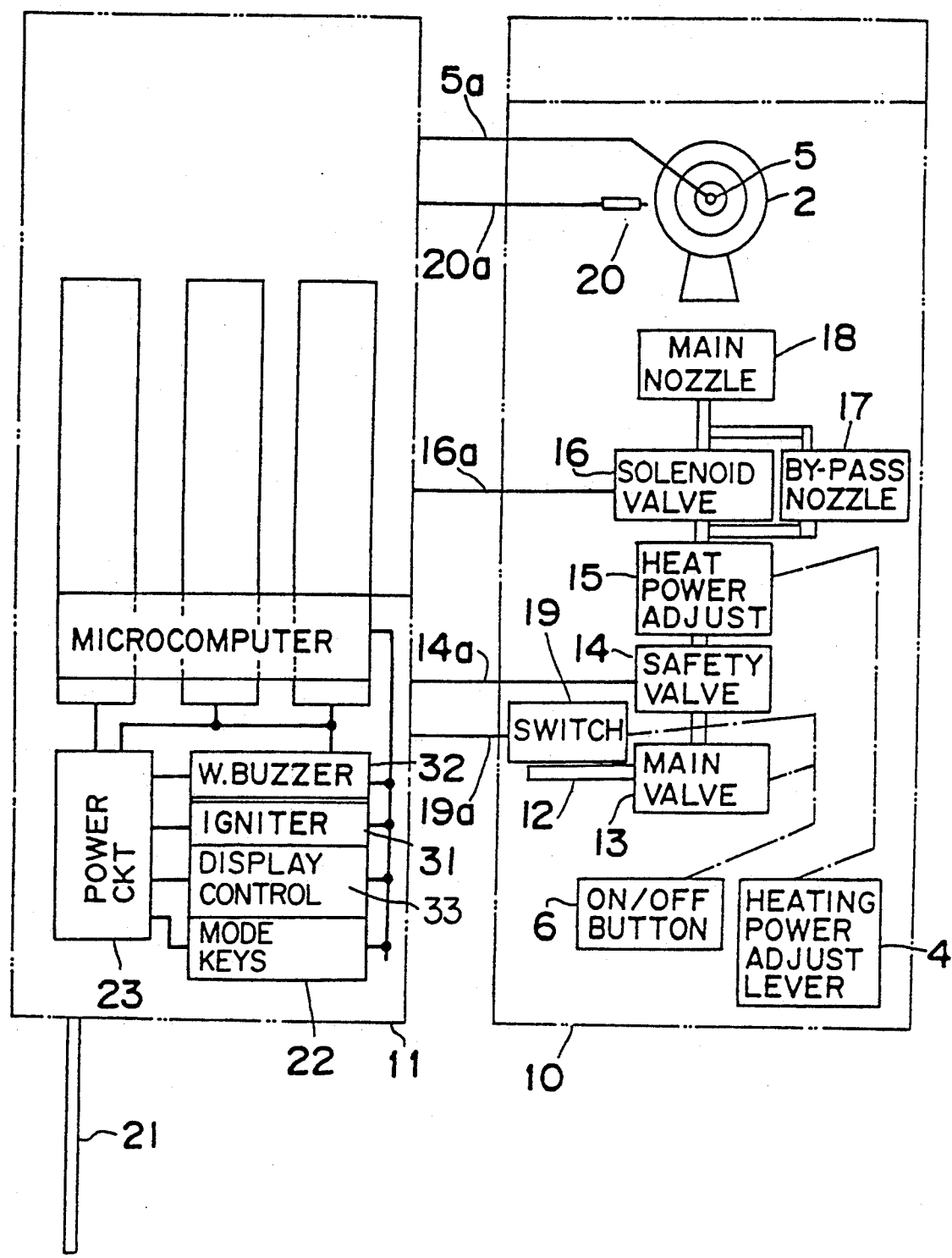
FIG. 2 is a block diagram showing the gas control circuit and the electronic circuitry of the gas cooking range shown in FIG. 1.

Referring to FIG. 2, the gas range R comprises a heating means 10 and an electronic circuit 11 for controlling the heating means 10. A plurality of heating means 10 composed of the gas burner 102 are provided in the gas cooking range R and can be controlled by the electronic circuit 11 which is composed of a microcomputer.

The heating means 10 includes a gas line 12 for receiving a gas from a gas source, the ignition/shut-off button 6 (FIG. 1), the burner control knob for adjusting the heating power 4 (FIG. 1), a main valve 13 for passing or shutting off the gas, a safety valve 14, a safety valve lead 14a, a flame, regulator 15 for adjusting the heating power by regulating the gas flame size, a solenoid valve 16, a solenoid valve lead 16a, a by-pass nozzle 17, a main nozzle 18, a switch 19, a switch lead 19a, a burner 2 for burning the gas, the pan bottom temperature sensor 5, a pan bottom temperature sensor lead 5a, an ignition electrode 20, and an ignition electrode lead 20a.

The opening and closing of the main valve 13 is mechanically controlled by operating the ignition/shut-off button 6 so as to pass or shut off the gas from the gas line 12. The opening and closing of the safety valve 14 is electronically controlled by the electronic circuit 11. Both the main valve 13 and the safety valve 14 regulate the flow of gas to the burner 2. The flame regulator 15 is manually controlled by the operation of the burner control knob 4 to adjust the flame size of gas. The solenoid valve 16 is electronically controlled to set the minimum gas flow. The by-pass nozzle 17 sets the minimum gas flow when the solenoid valve 16 is closed. The main nozzle 18 sets the maximum gas flow. The switch 19, burner 2, and pan bottom temperature sensor 5 function in conjunction with the ignition/shut-off button 6. The gas from the gas line 12 is supplied to the burner 2 through the main valve 13, the safety valve 14, the flame regulator 15, the solenoid valve 16, and the by-pass valve 17 which are mutually connected as shown in FIG. 2.

The electronic circuit block 11 includes a power supply circuit 23, mode keys 22 provided in the panel 1 (such as the simmer key 8 and boil key 7) for selecting the desirable cooking procedure, an igniter 31 for igniting the gas, a warning buzzer 32, and a display control 33. A power of AC 100 V is supplied to the electronic circuit 11 through a power supply cord 21 which is plugged into the power supply circuit 23. When the power is supplied to the electronic circuit 11 and the ignition/shut-off button 6 is pressed, the switch 19 is turned ON. Thus, power is supplied to the safety valve 14 and the solenoid valve 16 controlled by a heating control means 24 (FIG. 3), thereby operating both the safety valve 14 and solenoid valve 16. Gas is thus supplied through the gas line 12, main valve 13, safety valve 14, and flame regulator 15 to the solenoid valve 16 and the by-pass nozzle 17, and is supplied from both the solenoid valve 16 and the by-pass nozzle 17 to the main nozzle 18 and then to the burner 2. Combustion of the gas at the burner 2 is started by igniting the gas with a high voltage ignition spark emitted by the ignition electrode 20 of the igniter 31, which operates for a predetermined period from the time when the switch 19 is turned ON.

The temperature of the cooking materials is normally at about room temperature when the burner 2 is first ignited. The temperature of the pan bottom temperature sensor 5 is therefore also at about room temperature. The safety valve 14 and solenoid valve 16 are both open, and the heating power can be manually adjusted to any desirable level by the user operating the burner control knob 4 to control the flame regulator 15. When the flame regulator 15 is set to the lowest power position, the solenoid valve 16 is off (closed) and the heat output is the same as that allowed by the minimum gas flow from the by-pass nozzle 17. Thus, even if the solenoid valve 16 is removed, the same effect can be obtained by manually setting the burner control knob 4 to the lowest power setting.

The burner 2 is turned off by pressing the ignition/-shut-off button 6 again or by interrupting the electric power supplied to the safety valve 14.

The temperature of the cooking material naturally rises as this combustion state is maintained. The resistance of the pan bottom temperature sensor 5, which uses a thermistor as the temperature measuring element, also changes. This change in resistance is input to the electronic circuit block 11 via the pan bottom temperature sensor lead 5a.

A temperature detection means 25 (FIG. 3) of the electronic circuit block 11 detects the pan bottom temperature by applying a predetermined coefficient to the resistance of the pan bottom temperature sensor 5, which varies with the change in temperature, thus converting the resistance to a temperature at the pan bottom. It is to be noted that the temperature thus detected by the temperature detection means 25 is referred to as "detected temperature" herebelow.

Figure 3:
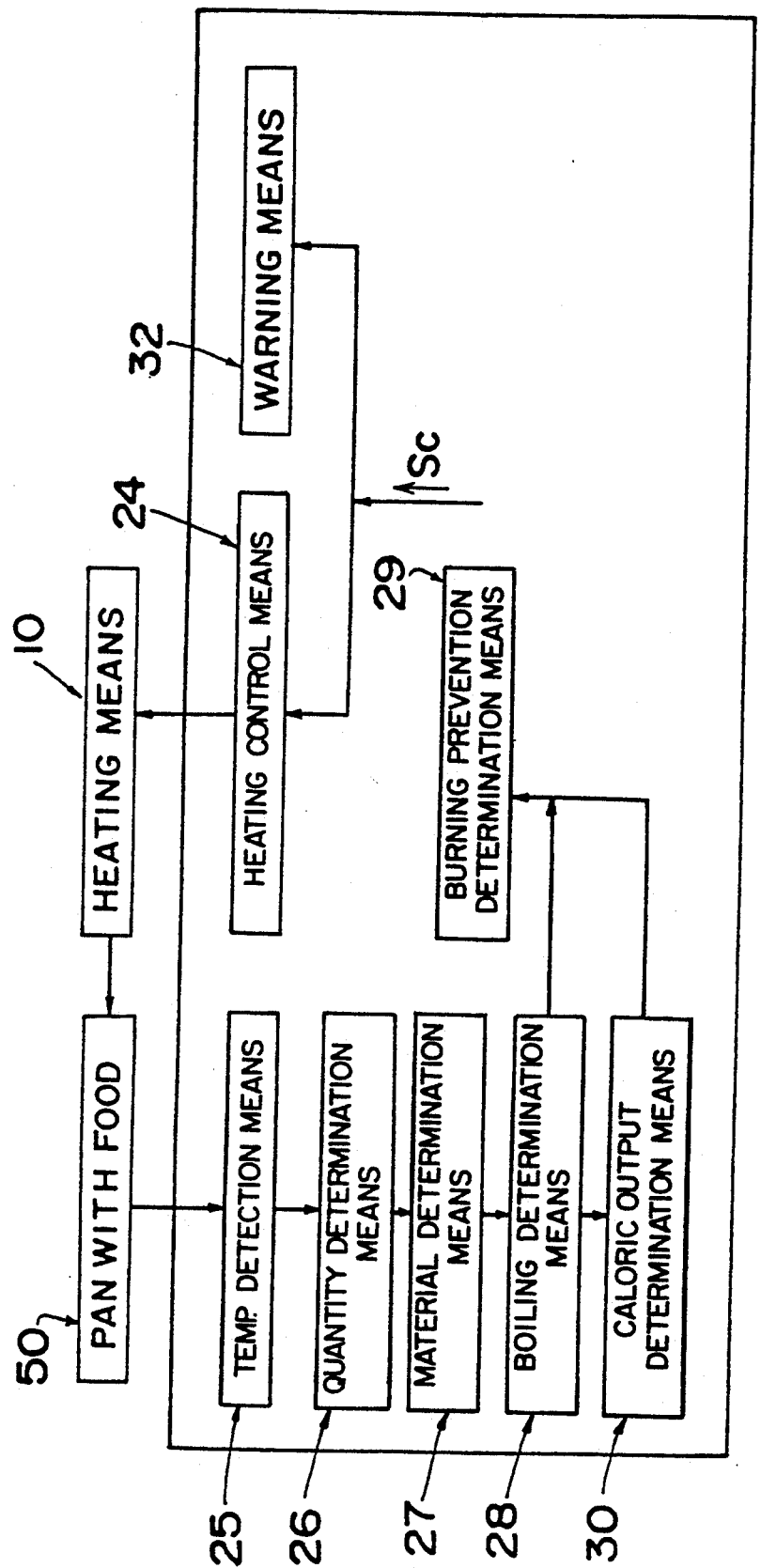
FIGS. 3 is a block diagram showing various determining means of the gas cooking range, shown in FIG. 1.

Referring to FIG. 3, a basic flow diagram of determination means which functions when one of cooking mode keys, for example, of the simmer key 8 is selected is shown. A pan containing the cooking material 50 is heated by the heating means 10 which is controlled by the heating control means 24, and its temperature is detected by the temperature detection means 25. The quantity of the cooking material is detected by a quantity determination means 26. The boiling state is determined by a boiling determination means 28 and then a burning point is set. The cooking contents are determined by a cooking material determination means 27, and the optimum caloric output setting after the contents of the pan boils is set by a caloric output determination means 30. While the heating means 10 controlled by the heating control means 24 keeps the pan simmering at the set calorie level, a burning prevention determination means 29 is operated to keep the cooking material from the overheating by monitoring the temperature thereof. When the burning point is reached, the burning prevention determination means 29 produces a burning prevention signal Sc and sends it to the heating control means 24 and the warning means 32. On receipt of the burning prevention signal Sc, the heating control means 24 reduces the heating power, and the warning means 32 produces a warning in a predetermined manner as described below.

Figure 4A:
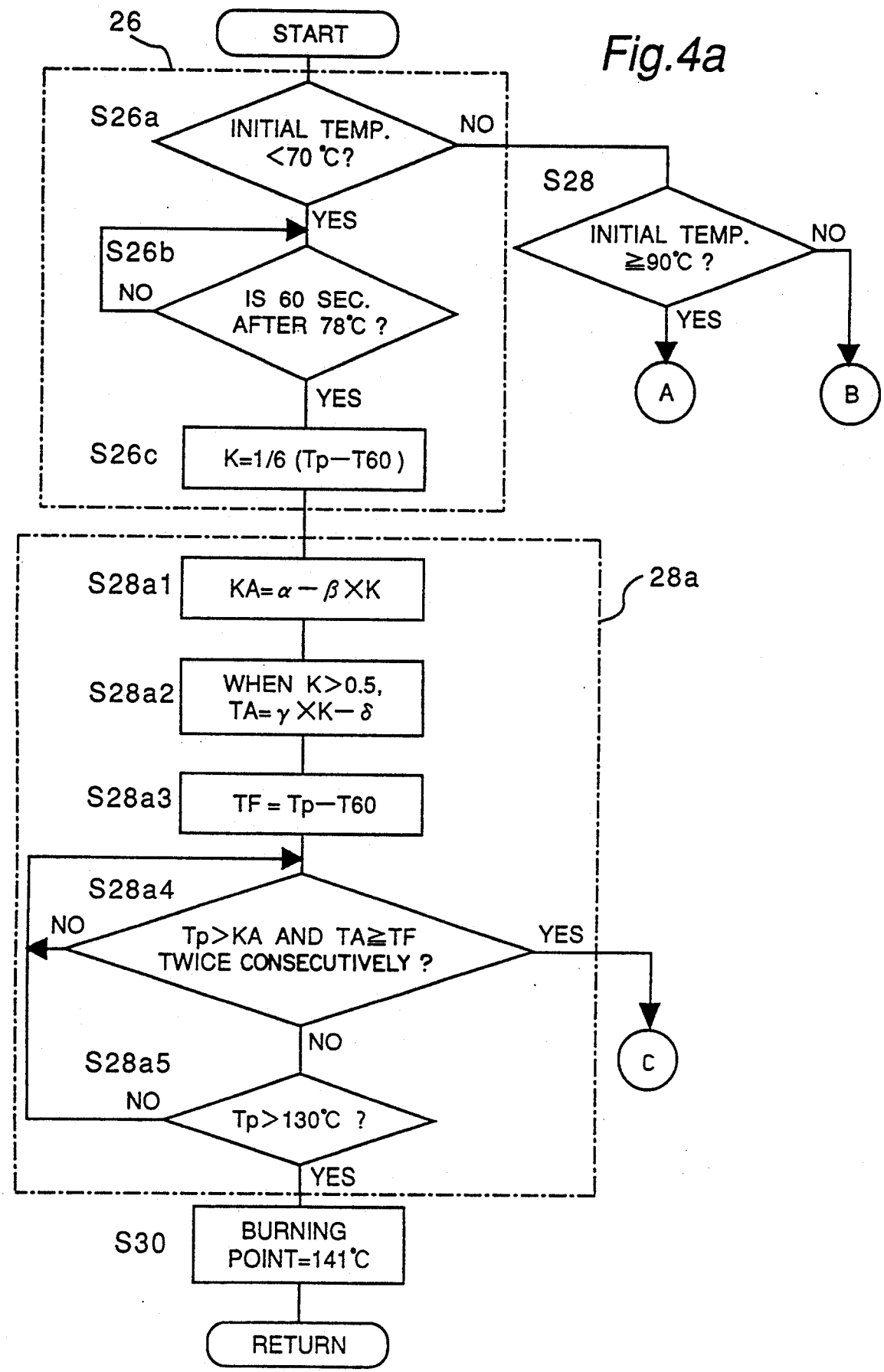
FIGS. 4a, 4b, 5 and 6 are flowcharts describing the operation of the gas cooking range shown in FIG. 1.
Figure 4B:
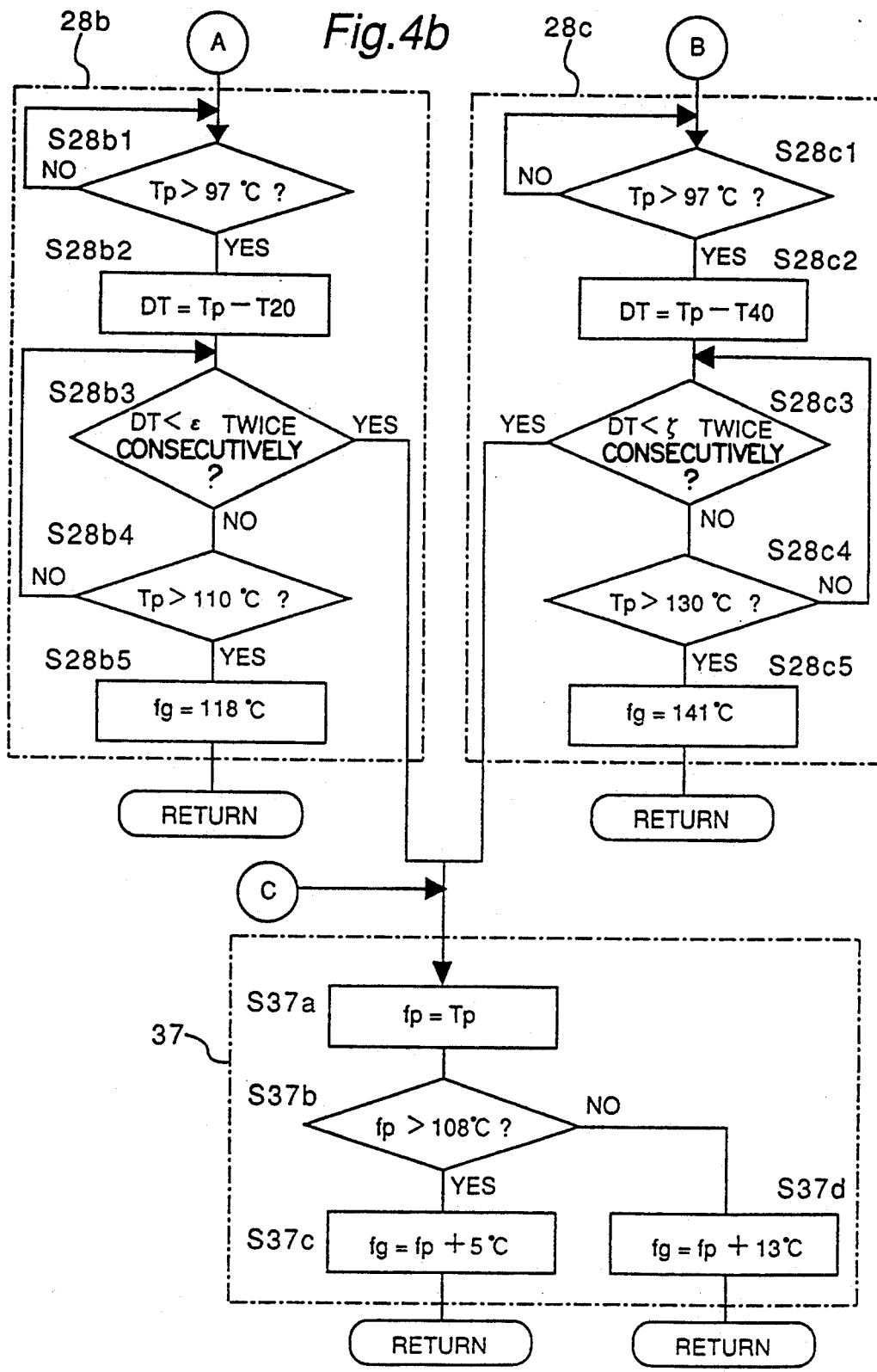

FIGS. 4a and 4b, show a flowchart describing the processes executed by the quantity determination means 26, the boiling determination means 28, and a burning prevention temperature setting means 37.

The boiling determination means 28 comprises three boiling evaluation means: a low temperature (max. 70° C.) boiling determination means 28a, as shown in FIG. 4a; a medium temperature (70°-90° C.) boiling determination means 28c; and a high temperature (min. 90° C.) boiling determination means 28b, as shown in FIG. 4b, based on the initial detected temperature of the pan (cooking contents).

In FIG. 4a, when the initial value of the detected temperature of the temperature detection means 25 is equal to or greater than 90° C., the operation advances to step S28b1 of the high temperature boiling determination means 28b through steps S26a and S28. When the initial detected temperature is between 70° C. and 90° C., the operation advances to step S28c1 of the medium temperature boiling determination means 28c through steps S26a and S28. When the initial detected temperature is lower than 70° C. at step S26a, the quantity determination means 26 reads the detected temperature at a regular predetermined time interval which is, for example, 60 seconds in this embodiment.

At step S26c, 60 seconds after detection that the detected temperature reaches 78° C. at step S26b, the temperature difference is divided by a predetermined value which is, for example, six in this embodiment and the quantity determination value K is calculated by the following equation.

$$K = 1/6 \, (Tp - T60) \tag{1}$$

(Tp: present detected temperature)

(T60: detected temperature 60 seconds earlier)
The temperature difference is calculated by subtracting the current temperature from the temperature obtained 60 seconds before. This quantity determination value K is the same as the temperature gradient per 60 seconds. Then, the operation advances to step S28a1.

At step S28a1, an estimated boiling temperature KA is calculated by the following equation, using the quantity determination value K obtained at step S28a1.

$$KA = \alpha - \beta \times K \tag{2}$$

($\alpha$: experimental value, 98.5 is preferable)

($\beta$: experimental value, 1.9 is preferable)

At step S28a2, a boiling determination temperature TA is calculated by the following equation, using the quantity determination value K obtained at step S28a1.

$$TA = \Delta \times K - \delta \tag{3}$$

($\gamma$: experimental value, 4 is preferable)

($\gamma$: experimental value, 1.2 is preferable)

At step S28a3, a boiling determination temperature rise TF per 60 seconds which is the difference between the present temperature and the temperature obtained 60 seconds earlier by the following equation.

$$TF = Tp - T60 \tag{4}$$

At step S28a4, the boiling determination temperature rise TF is used to determine whether the pan is boiling or not in the following manner. When two conditions, (i) the present detected temperature Tp is greater than the estimated boiling temperature KA, (ii) and the calculated temperature rise TF is equal to or lower than the boiling determination temperature TA, are detected at least twice consecutively, the contents of the pan is determined to be boiling. Then, the operation advances to step S37a of the burning prevention temperature setting means 37.

When it is determined that the cooking material is still boiling even after the detected temperature exceeds a predetermined threshold temperature which is, for example, 130° C. in this embodiment at step S28a5, the burning point is defined to be a predetermined temperature which is, for example, 141° C. in this embodiment at step S30. It is to be noted that the burning point fg, which is 141° C. in this case, is also defined as the burning prevention temperature.

Referring to FIG. 4b, the operation of the burning prevention temperature setting means 37 is described.

At step S37a, the present detected temperature Tp is adapted as the boiling temperature fp, since the contents of has been determined to be boiling at the previous step S28a4.

At step S37b, thus obtained boiling temperature fp is compared with a predetermined heat conductivity determination value, (for example, 108° C.) employed to determine the thermal conductivity of the pan with cooking material in the following manner. When the boiling temperature fp is higher than 108° C., a low specified thermal conductivity value which is, for example, 5° C. is added to the boiling temperature fp to set the burning prevention temperature fg at step 37c. When the boiling temperature fp is not higher than 108° C., a high specified thermal conductivity value which is, for example, 13° C. is added to the boiling temperature fp to set the burning prevention temperature fg at step 37d.

As described above with reference to FIG. 4a, when the initial detected temperature is between 70° C. and 90° C., the operation is processed by the medium temperature boiling determination means 28c in a manner as described below.

At step S28c1, when the present detected temperature Tp exceeds a predetermined temperature which is, for example, 97° C., the operation advances the next step S28c2.

At step S28c2, a temperature rise DT per 40 seconds which is the difference between the present temperature and the temperature obtained a predetermined period, for example, 40 seconds, earlier is calculated by the following equation.

$$DT = Tp - T40 \qquad (5)$$

(T40: detected temperature 40 seconds earlier)

At step S28c3, thus obtained temperature rise DT is used to determine whether or not the contents of the pane is boiling. When it is detected that the temperature rise DT is less than ζ, which is an experimentally obtained threshold value (i.e., 2.7), at least twice consecutively, the cooking material is determined to be boiling and the operation advances to step S37a.

When it is determined that the cooking material is still not boiling even after the temperature exceeds a predetermined threshold temperature which is, for example, 130° C. in this embodiment at step S28c4, the burning prevention point fg is defined to be a predetermined temperature which is, for example, 141° C. at step S28c5. As described above with reference to FIG. 4a, when the initial detected temperature is higher than 90° C., the operation is processed by the high temperature boiling determination means 28b in a manner as described below.

At step S28b1, when the present temperature Tp exceeds a predetermined temperature which is, for example, 97° C., the operation advances the next step S28b2.

At step S28b2, a temperature rise DT for 20 seconds which is the difference between the present temperature and the temperature a predetermined period, for example 20 seconds, earlier is calculated by the following equation.

$$DT = Tp - T20 \qquad (6)$$

(T20: detected temperature 20 seconds earlier)

At step S28b3, thus obtained temperature, rise DT is used to determine whether or not the contents of the pan is boiling. When it is detected that the temperature rise DT is less than ε, which is an experimentally obtained value (i.e., 1.5), at least twice consecutively, the cooking material is determined to be boiling and the operation advances to step S37a.

When it is determined that the cooking material is still not boiling even after the temperature exceeds a predetermined threshold temperature which is, for example, 110° C. in this embodiment at step S28b4, the burning prevention point fg is defined to be a predetermined temperature which is, for example, 118° C. at step S28b5.

The resulting values are then output to the next stage determination means and indicators, and to the cooking timer that is activated from the time when the pan boils. It is to be noted that the above described values $\alpha$, $\beta$, $\gamma$, $\delta$, $\epsilon$, and $\zeta$ are experimentally obtained and the specific values given above are merely examples, so that other values can be employed for the present invention.

Figure 5:
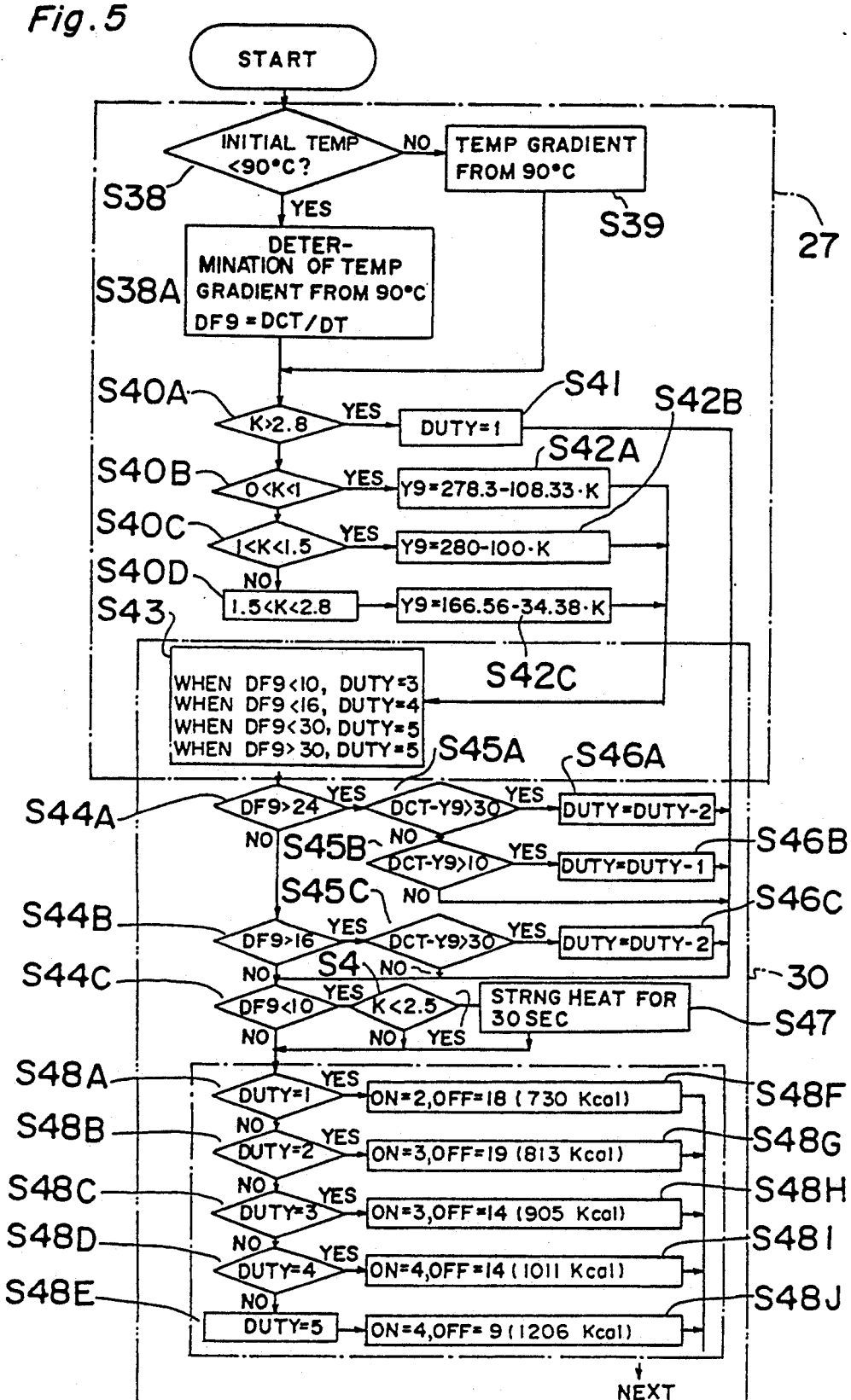

FIG. 5 is a flowchart describing the operation of the cooking material determination means 27 and the caloric output determination means 30. The cooking material determination means 27 comprises steps S38 through S43 in FIG. 5, and the caloric output determination means 28 comprises steps S43 through S48. The cooking material determination means 27 is described first.

At step S38, it is judged whether or not the initial detected temperature of the temperature detection means 25 is less than 90° C. or not. When it is YES, the operation advances to step S38A.

At step S38A, the detected temperature is read by the cooking material determination means 27 at each predetermined period until the detected temperature reaches 90° C. The temperature difference DT and time DCT which is from the point when the detected temperature reaches 90° C. to the point when the boiling is determined by the boiling determination means 28, are stored, and the inverse of the temperature difference DT divided by the time DCT is defined as a cooking contents coefficient DF9. Then the operation advances to step S40A. The cooking contents coefficient DF9 can be calculated by the following equation.

$$DF9 = DCT/DT \qquad (7)$$

When the initial detected temperature of the temperature detection means 25 is not less than 90° C., it is determined as NO at step S38. Then, the operation advances to step S39 at which the temperature gradient for the period from the time after 90° C. is obtained to the time when boiling is detected is obtained.

At step S39, a constant 18 is substituted for the cooking material coefficient DF9, and a constant 2 is substituted for the quantity determination value K.

At steps S40A to S40D, a series of conditions dependent upon the quantity determination value K is then tested in the following manner.

At step S40A, it is judged whether or not the quantity determination value K is greater than a first predetermined value, such as 2.8. When K is greater than 2.8, a constant 1 is substituted for a heating level DUTY to set the caloric output of the burner 2 at the lowest level at step S41. The heating level DUTY is a parameter representing a plural caloric output levels by changing the heating pattern, the detail of which will be described later. Then, the operation skips and advances to step S44C of the boiling determination means 28.

When K is between 2.8 and 1 (at step S40A), the normally required time Y9 for water to boil from a starting temperature of 90° C. is calculated by the following equation at step S42A. Then, the operation advances to step S43.

$$Y9 = 278.3 - 108.33 \times K \qquad (8)$$

When K is judged as between 0 and 1 (at step S40B), the normal required time Y9 is calculated by the following equation at Step S42B, and then the operation advances to step S43.

$$Y9 = 280 - 100 \times K \qquad (9)$$

When K is between 1 and 1.5 (at step S40C), the normal required time Y9 is calculated by the following equation at Step S42C, and then the operation advances to step S43.

$$Y9 = 166.56 - 34.38 \times K \qquad (10)$$

It is to be noted that values of 278.3, 108.33, 280, 100, 166.56, and 34.38 shown in the above equations (8), (9), and (10) are examples and other suitable values can be employed for the gas range R according to the preferred embodiment of the present invention.

At step S43, the caloric output determination means 28 sets an approximate caloric output level based on the cooking contents coefficient DF9 obtained from the cooking contents determination means 27 such that constants 3, 4, 5, and 4 are set as DUTY, respectively, when DF9 is less than 10, between 10 and 16, between 16 and 30, and greater than 30. Then the operation advances to step S44A.

At steps S44A and S44B, a series of conditions dependent upon the value of the cooking contents coefficient DF9 is tested, and the caloric output level is adjusted at each of steps 46A, 46B and 46C according to the value of the time DCT minus the normally required time Y9, as obtained at each of steps S45A, S45B to S45C.

When DF9 is greater than 24 (step S44A) and DCT−Y9 is greater than 30 (step S45A), DUTY−2 is set as DUTY at step S46A and the operation advances to step S44C. However, when DCT−Y9 is between 30 and 10 (step S45B), DUTY−1 is set as DUTY at step S46B and the operation advances to step S44C. When DCT—Y9 is not greater than 10, the operation advances to step S44C without setting DUTY.

When DF9 is between 24 and 16 (step S44B) and DCT−Y9 is greater than 30, the operation advances to step S44C after setting DUTY−2 as DUTY at step S46C. However, if DCT −Y9 is not greater than 30, the operation advances to step S44C without setting DUTY.

At step S44C, it is judged whether or not DF9 is less than 10. If YES, and K is judged as less than 2.5 at step S4, a high level heating for 30 seconds is executed at step S47. Thus, the value of the cooking contents coefficient DF9 and the quantity determination value K are tested to determine whether or not a 30 second high combustion period is required.

At steps S48A to S48J, the setting of DUTY is then tested to determine the duty combustion constants for the cycled high and low combustion periods, eventually setting the calory setting in the following manner.

When DUTY is 1 at step S48A, constant values 2 and 18 are set to ON and OFF, respectively, at step S48F. In this case, the heating means 10 burns the gas at a high combustion level for 2 seconds and at a low combustion level for 18 seconds alternatively, resulting in the calorie output level of 730 Kilocalories per hour.

When DUTY is 2 at step S48B, constant values 3 and 19 are set to ON and OFF, respectively at step S48G, resulting in the calorie output level of 813 kilocalories per hour.

When DUTY is 3 at step S48C, constant values 3 and 14 are set to ON and OFF, respectively at step S48H, resulting in the calorie output level of 905 kilocalories per hour.

When DUTY is 4 at step S48D, constant values 4 and 14 are set to ON and OFF, respectively at step S48I, resulting in the calorie output level of 1011 kilocalories per hour.

When DUTY is not any of 1, 2, 3, and 4, a constant 5 is set to DUTY at step S48E, and constant values 4 and 9 are set to ON and OFF, respectively at step S48J, resulting in the calorie output level of 1206 kilocalories. Then, each of corresponding signals to steps S48F, S48G, S48H, S48I, and S48J is then sent to the combustion control means in the next stage.

Figure 6:
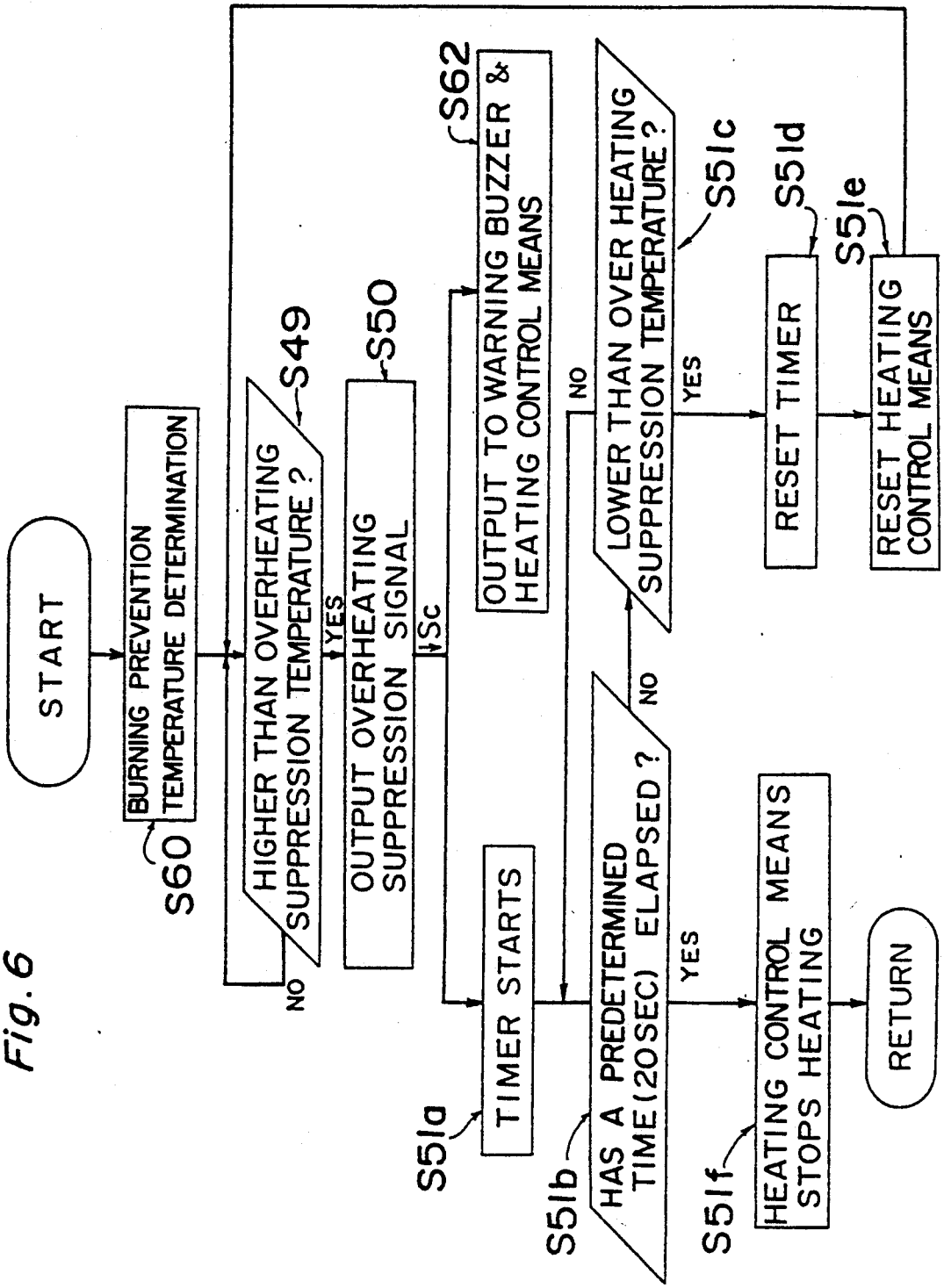

Referring to FIG. 6, a flow chart describing the operation of the burning prevention determination means 29 is shown.

At step S60, a burning prevention temperature fg is determined, as previously described with reference to FIGS. 4a and 4b.

At step S49, the detected temperature of the cooking materials is compared with the burning prevention determination temperature fg, suppression temperature.

When the detected temperature exceeds the burning point, the burning prevention signal Sc which is the same as an overheating suppression signal is used in step S51a at which a timer starts and in step S62 at which a signal is output to activate to the warning buzzer 32 and the heating control means 24.

At step S51b, it is judged whether or not a predetermined period, for example, 20 seconds has elapsed. If YES at step S51b, the heating control means 24 stops heating at step S51f to prevent the cooking material from being overheated. However, if NO at step S51b, it is judged whether the detected temperature drops below the burning prevention point fg at step S51c. During this period it is determined whether the detected temperature drops below the burning point (step 51c). This temperature drop could be because the heating control means 24 is operated to reduce the caloric output or because of secondary intervention, e.g., the cooking contents are stirred or additional items are added to the pan. Therefore, when the detected temperature is below the burning point at step 51c, the timer is reset at step 51d and the heating control means 24 is reset, and then the control procedure loops back to step S49.

It is therefore possible by means of gas cooking range R according to the preferred embodiment of the present invention shown in FIG. 3 to automatically determine the quantity and contents of the pan, and thereby automatically set the caloric output of the burner 2 after the cooking contents boil. This conditional control operation is not possible with the single-calorie heating level of a conventional gas cooking range Rc according to the prior art.

Figure 12:
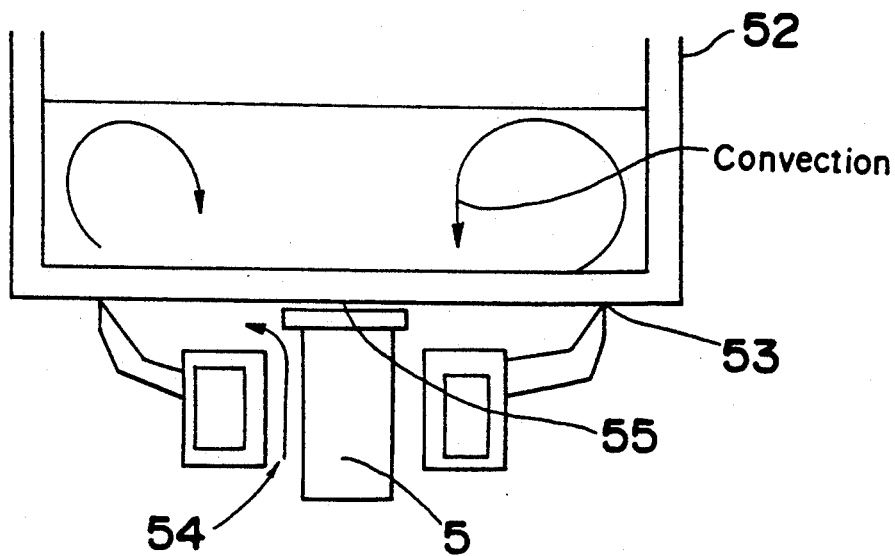
FIG. 12 is an illustration of the heat distribution in a pan heated by the gas cooking range shown in FIG. 1.
Figure 13:
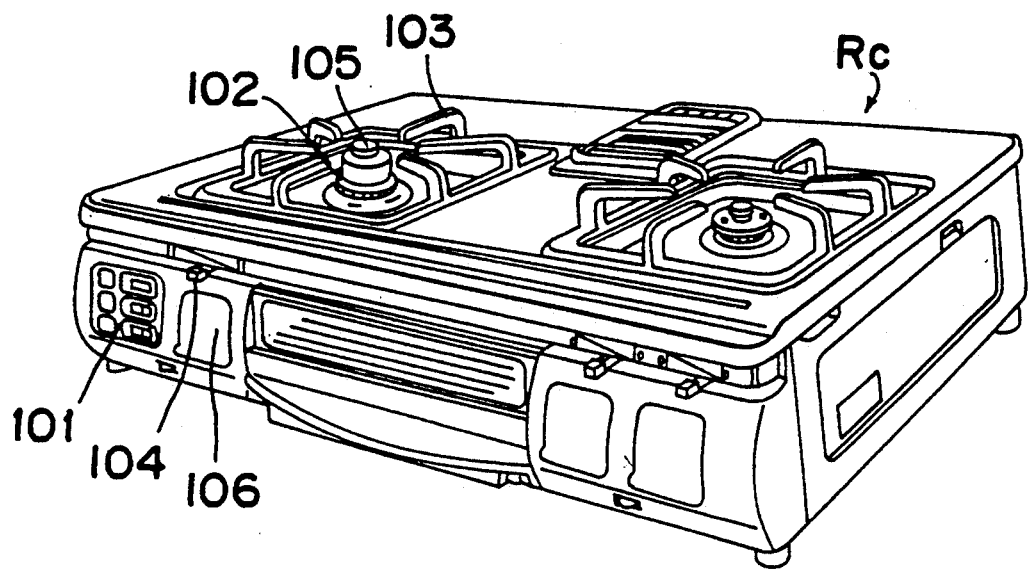
FIG. 13 is an oblique frontal view of a conventional gas cooking range.
Figure 14:
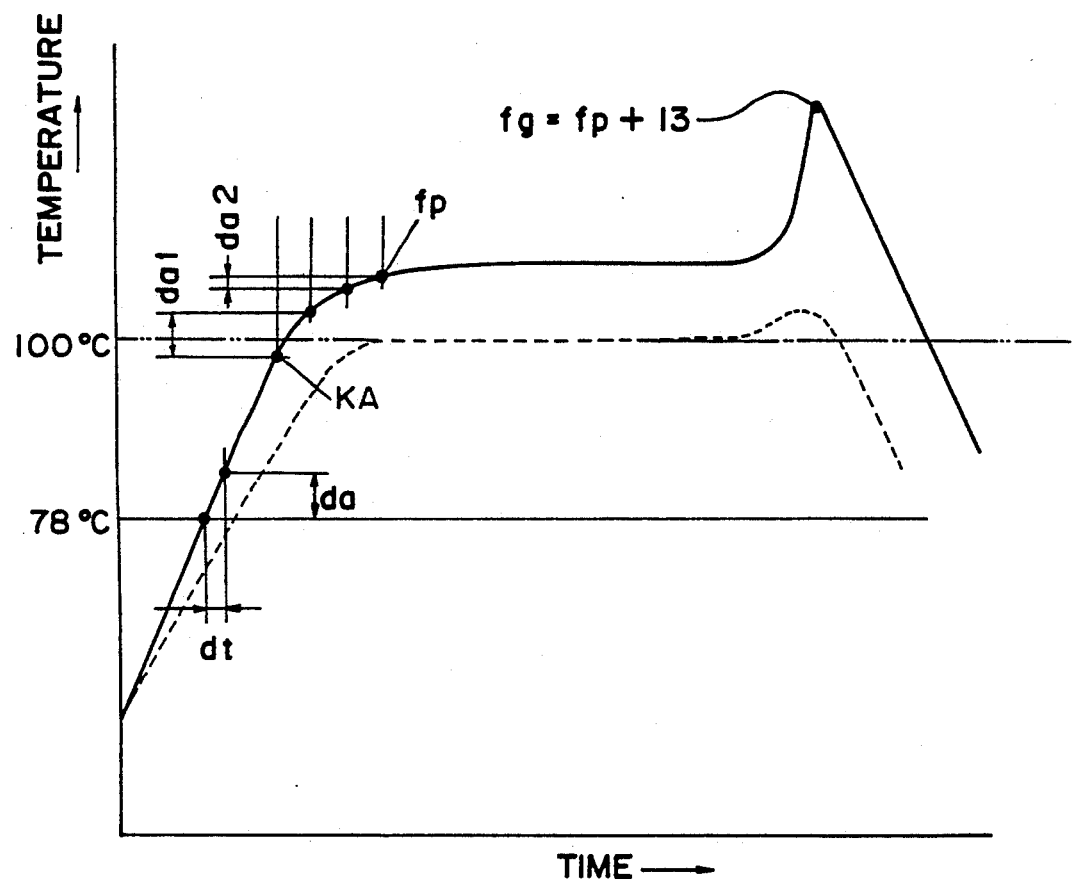
FIG. 14 is a graph illustrating the boiling determination conditions of the conventional gas cooking range shown in FIG. 13.

As shown in FIG. 4a and 4b, a boiling temperature detection range (the lower and upper limits of which are referred to hereinabove as KA or 97° C. and 130° C. or 110° C., respectively) is set in the boiling determination means 28. The boiling is determined within this range. The boiling temperature fp is set by determining whether the cooking contents are boiling or not, and the boiling temperature fp is then compared with a predetermined thermal conductive value (108° C.). Depending on the result of this comparison at step S37b, indicating the heat transfer efficiency, a predetermined value (5° C., 13° C.) is added to the boiling temperature fp to set the burning prevention temperature fg (at steps 37c and 37d). These means are required because a pan 52 containing the cooking contents is directly heated by the heating means 10 where the flames of the burner 2 contact the bottom of the pan 52 at a specific heating point 53 as shown in FIG. 12.

Heat is then transferred by thermal conduction through the body of the pan 52 and to the cooking contents. As the heat of the heated pan 52 spreads from the heating point 53 through the pan 52 to the cooking contents, a convection current that works to evenly distribute heat through the cooking contents is created inside the pan. The pan bottom temperature sensor 5 provided at the bottom center of the pan detects these two types of heat (direct and transfer). It is to be noted that a secondary air flow 54 cools the pan bottom temperature sensor 5 to reduce the influence of direct heat from the flame.

When the cooking contents are dense, this convection current is slow, thus slowing the transfer of heat by the heat current to the center of the pan, and increasing the boiling temperature. The specific gravity of the cooking contents also rises as compared with water, and the boiling temperature rises. Thus, the higher the boiling temperature, the greater the possibility of the cooking contents becoming burnt or overdone.

Referring to FIG. 8, the temperature curves at the bottom of the pans heated to boil the water contained therein according to the materials of which the pans are made are shown. A line L1 shows the temperature of 100° C. of water. A line L2 shows the temperature changes when the pan is made of a thin aluminum, indicating a boiling point of 102° C. A line L3 shows the temperature changes when the pan is made of a thick aluminum, indicating a boiling point of 105° C. A line L4 shows the temperature changes when the pan is made of a enameled iron, indicating a boiling point of 107° C. A line L5 shows the temperature changes when the pan is made of a heat-proof glass. A line L6 shows the temperature changes when the pan is made of a earthen or stone ware, indicating a boiling temperature of 125° C.

A boiling temperature detection range H defined by an upper threshold temperature Lh and a lower threshold temperature L( is provided for the following reasons. The temperature of the pan bottom rises rapidly as the temperature of water inside the pan rises. After the contents start to boil the gradient of the temperature curve drops off rapidly but at varying rates depending upon the material from which the pan is made. Using this change in slope, the upper threshold temperature Lh can be provided for the boiling determination.

The upper threshold temperature Lh is set at approximately 130° C. considering the boiling temperature measured at the measurement position 55 of an earthen pan's bottom shown in FIG. 12. The upper threshold temperature Lh of 130° C. or greater is well above the maximum possible boiling temperature of a metal pan, and is the borderline of the maximum usable temperature with the earthen pan.

The lower threshold temperature L( of the boiling temperature detection range H is set slightly below (about 97° C.) the boiling point of water to allow for equipment error, improve the boiling determination precision, provide for adaptive compatibility with different types of pans, and for preparation of foods that are semi-cooked and preheated. When the starting temperature (initial detected temperature) is low, boiling precision is emphasized; when the starting temperature is in the mid-range, determination speed is emphasized. This assures prompt, timely switching of burner output and thus prevents boil-overs and avoids creating user uncertainty that the stove is not functioning correctly because the pan is boiling and the burner 2 remains on the high setting.

Also as shown in FIG. 4a, the quantity determination means 26 is provided to determine the quantity determination value K, and in FIG. 5 the cooking material determination means 27 is provided to determine the cooking contents coefficient DF9. The reasons these are needed is explained by an analysis of the change in temperature at the measurement position 55 when water and other cooking contents are boiled in the same pan with walls of an even thickness and the same material with reference to FIGS. 9A to 9D and FIG. 10.

A line L9A shows the temperature change when the pan contains water only as shown in FIG. 9A. The boiling point is low and the heat current inside the pan is strong, resulting in an even, rising curve.

A line L9B shows the temperature change when the pan contains a small amount of fish to be simmered in a soy sauce stock as shown in FIG. 9B. The boiling point is high, the heat flow inside the pan is small, and the quantity is low, resulting in a rapid increase in temperature.

A line L9C shows the temperature change when the pan contains diced food as shown in FIG. 9C. The boiling point is higher than that of water and the heat flow inside the pan is relatively good, but the time required from 90° C. to boiling point is longer than that with water, and the change in the curve is varying more than that with water.

A line L9D shows the temperature change when the pan contains large chunks as shown in FIG. 9D. The boiling point is slightly higher than that of water and the curve of the temperature rise is not that much different from the other curves up to 90° C. The time required from 90° C. to boiling is noticeably longer, however, and the curve of the rise drops sharply.

This shows that there are detectable differences in cooking when the temperature rises to 90° C. (the quantity determination means 26) and when the temperature rises from 90° C. to boiling (the cooking contents determination means 27). In addition, there is a clear difference in the temperature curve to 90° C. between the example of line L9B (small quantity) and the other examples. With these kinds of foods, the quantity determination means 26 alone can appropriately set the caloric output to the cooking contents in everyday practical use.

Figure 11:
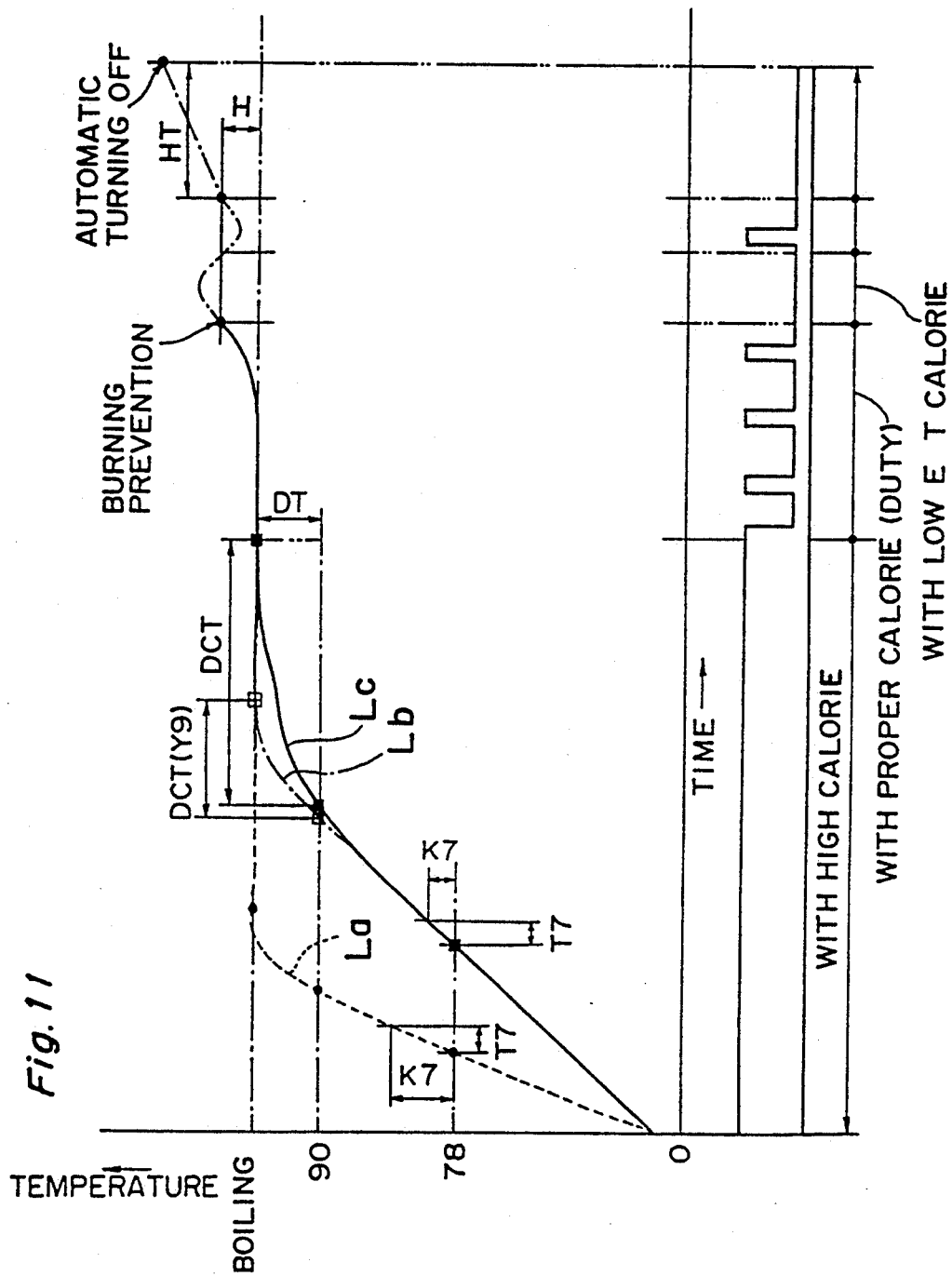
FIG. 11 is a graph illustrating the basic principle of operation of the gas range shown in FIG. 1 as applied to pans with different cooking contents.

Referring to FIG. 11, the underlying principle of the above is described. The temperature rise curves La, Lb, and Lc are for a small quantity of water, a large quantity of water, and chunk-size boiled vegetables, respectively. The difference between the temperature rise curves La and, Lb and Lc in the quantity of the cooking contents in the pan can be determined by the temperature rise K7 per unit time T7 from when the temperature reaches 78° C. It is to be noted that K7/T7 gives the quantity determination value K as previously described with reference to step S26c in FIG. 4a. As the difference in the temperature rise curves of Lb and Lc increases (how different is the time Y9 for the curves Lb and Lc to rise from 90° C. to the boiling point when compared with that of the curve La), the caloric output of the burner 2 is lowered to adjust for differences in the actual cooking procedures.

The caloric output determination means 30 shown in FIG. 3 sets an approximate caloric output level based on the cooking contents as represented by the cooking contents coefficient DF9 obtained from the cooking contents determination means 27.

In tests with common foods boiled in the home and based on the appropriate caloric output suited to the tested dishes prepared in quantities for two to eight people, the caloric output range of 700-1200 kcal/hr was divided into five steps (the caloric output setting steps S48A to S48E in FIG. 5). Tests showed that by setting the caloric output in five steps, the heating apparatus for cooking and pan heating control method of the invention can automatically and appropriately set the caloric output of the burner 2 to the quantity and type of the cooking contents after the cooking contents boil because the main caloric output setting is obtained by effectively determining the type of the cooking contents. Caloric output control is therefore possible even when the initial temperature of the cooking contents is within the mid-range temperature zone and cooking is not started from a low temperature, thus providing greater convenience.

As described above, the tendency of the same foods to burn will differ even at the same burning point depending upon the type and thickness of the material used to make the pan 52. The burning prevention determination means 29 shown in FIG. 6 is provided to eliminate this problem and the problem of the burning prevention means being activated and shutting off the burner 2 even though the cooking contents are not completely done. The burning prevention temperature is therefore set variably according to the pan bottom temperature when the cooking contents boil to assure that all foods are cooked to the same degree.

The burning prevention determination means 29 of the present invention also provides added convenience by not immediately shutting off the burner 2 when the detected temperature reaches the set burning prevention temperature when used in combination with a limit timer that makes it possible to detect secondary intervention with the cooking process, specifically a lowering of the detected temperature caused by the user stirring or adding to the cooking contents.

In summary, the pan heating control method and heating apparatus for cooking comprising a quantity determination means, cooking contents determination means, boiling determination means, and caloric output determination means according to the present invention provide the following benefits.

(1) Automatic cooking is made possible by automatically adjusting the optimum caloric output of the burner to the quantity and content of the pan after the cooking contents boil.

(2) Excessive fuel consumption is eliminated by automatically controlling the caloric output of the burner to the cooking contents of the pan after the cooking contents boil.

(3) Wide adaptability is provided enabling application with semi-cooked foods having a high initial calorie determination temperature because the caloric output determination means is within the cooking contents determination means.

(4) Burning around the sides of the pan can be prevented for more dependable cooking results with small quantities because emphasis is placed on the quantity determination and the calorie determination result is therefore returned quickly.

(5) The boiling temperature detection precision is high when the initial detected temperature is low because the boiling temperature determination results from a three condition evaluation based on the initial temperature.

(6) Boil-overs can be prevented when the initial detected temperature is high because the cooking contents are already boiling; the boiling determination is therefore completed quickly, and the high heat cooking time is minimized.

(7) It is possible to determine whether the pan contains a little or a lot of moisture.

(8) It is possible to determine the heat transfer efficiency of the pan containing the cooking contents.

(9) Operating errors such as the burner being shut off too early can be reduced, and the burner can be correctly shut off when the water disappears because the burning prevention temperature is set according to the boiling temperature with clearly defined high/low temperature ranges.

(10) Improved burning prevention precision is possible, reducing burning from the burner being shut off too late.

(11) Secondary interventions such as the user stirring the cooking contents can be detected and compensated for by providing a predetermined time lag, and

(12) the burner can be automatically shut off to prevent burning after the passage of this predetermined time lag and there is no secondary intervention such as when the user is not nearby, because an alarm is issued when the temperature of the temperature determination means reaches the burning prevention temperature, the caloric output of the burner is automatically reduced, a time lag is provided before the burner is automatically shut off, and the burner is reset to the previous caloric output setting when the temperature of the temperature determination means drops below the burning prevention temperature during this time lag.

When the boiling temperature is greater than the upper threshold temperature of the boiling temperature detection range as with a stoneware cooking vessel or earthen pan, a temperature (e.g., 141° C.) which will not result in overheating of the cooking contents and possibly fire is set as the burning prevention temperature by the boiling determination means, and this temperature is used for operation of the burning prevention means.

Although the present invention has been fully described in connection with the preferred embodiment thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A heating apparatus for heating material in a water contained vessel by heating said vessel, said apparatus comprising:

a heating means for heating said vessel;

a temperature detection means for detecting the temperature of said vessel;

a first temperature change detection means for detecting a first temperature gradient of said detected temperature while the temperature of said vessel is in a first temperature range below a predetermined temperature;

a quantity determining means for determining the quantity of said materials based on said detected temperature gradient and for producing a quantity factor indicative of said quantity;

a boiling maintained temperature determining means for determining a boiling maintained temperature based on said detected temperature gradient;

a second temperature change detection means for detecting a second temperature gradient of said detected temperature range above said predetermined temperature and below said detected boiling maintained temperature;

a material determining means for determining the temperature gradient and for producing a material factor indicative of said heating material; and a heating control means for controlling the heat quantity of said heating means according to said quantity factor and said material factor.

2. A heating apparatus as claimed in claim 1, wherein said heating control means comprises a by-pass means for controlling said heating means at a predetermined heat quantity after reaching said boiling maintained temperature when said first temperature gradient is greater than a first predetermined temperature gradient.

3. A heating apparatus as claimed in claim 1, further comprising burning temperature determination means for determining a burning temperature of said materials based on said first temperature gradients and a temperature rise in said second temperature range.

4. A heating apparatus as claimed in claim 3 further comprising an alarm producing means for producing an alarm signal when said detected temperature reaches said burning temperature.

5. A heating apparatus as claimed in claim 4, further comprising a burning prevention means which comprises a stop means for stopping said heating means on receipt said alarm signal.

6. A heating apparatus as claimed in claim 5, wherein said burning prevention means further comprises a timer means for counting a predetermined time to delay the function of said stop means.

7. A heating apparatus as claimed in claim 6, wherein said burning prevention means further comprises a reset means for resetting said timer means when said detected temperature is reduced by a predetermined temperature difference.

8. A heating apparatus as claimed in claim 4, wherein said burning prevention means further comprises a warning means for producing warning on receipt of said alarm signal.

9. A method for heating materials in a water contained vessel by a cooking apparatus comprising a heating means for heating said vessel, a temperature detection means for detecting the temperature of said vessel, and a heating control means for controlling the heat quantity of said heating means based on said detected temperature, said method comprising the steps of:

detecting a first temperature gradient of said detected temperature while the temperature of said vessel is in a first temperature range below a predetermined temperature;

determining the quantity of said materials based on said detected temperature gradient and producing a quantity factor indicative of said quantity;

determining a boiling maintained temperature of said detected temperature gradient;

detecting a second temperature gradient while the temperature of said vessel is in a second temperature range above said predetermined temperature and below said detected boiling maintained temperature;

determining the material of said heating materials based on said second temperature gradient;

producing a material factor indicative of said material; and controlling the heat quantity of said heating means according to said quantity factor and said material factor.

10. A method as claimed in claim 9, further comprising the steps of:

determining a burning temperature of said heating materials based on said first temperature gradients and a temperature rise in said second temperature range;

producing an alarm signal when said detected temperature reaches said burning temperature;

producing a warning on receipt of said alarm signal; and stopping said heating means on receipt said alarm signal.

11. A method as claimed in claim 10, further comprising the step of counting a predetermined time to delay the function of said stopping step.

12. A method as claimed in claim 10, further comprising the step of resetting the time counting of said counting step to zero when said detected temperature is reduced by a predetermined temperature.

13. A heating apparatus comprising:

a heating means for heating a vessel containing a cooking material to be cooked;

a temperature detecting means for detecting a temperature of said vessel; and a heating control means operable in response to a signal from said temperature detecting means for controlling a heating power generated by said heating means;

wherein said heating control means detects a temperature rise characteristic of said vessel for a predetermined period during a time sequence from a start of heating until said cooking material boils by means of said temperature detecting means, and determines the quantity of said cooking material in a first temperature region of said temperature rise characteristic, and determines the contents of said cooking material such as type of said cooking material in a second temperature region of said temperature rise characteristic which is higher than said first temperature region, and controls the heating power of said heating means according to results of both determinations.

14. A heating apparatus as claimed in claim 13, wherein said heating control means is inhibited by determining the contents of said cooking material when said temperature rise characteristic in said first temperature region is higher than a predetermined value, and controls said heating means to generate a predetermined heat quantity after said cooking material begins to boil.

15. A heating apparatus as claimed in claim 13, wherein said heating control means further comprises scorch prevention determining means for effecting at least one of warning and a heat control of said heating means in the event that a signal from said temperature detecting means attains a temperature higher by a predetermined value than a boiling temperature of said cooking material.

16. A heating apparatus as claimed in claim 15, wherein said heating control means further comprises a limit timer means, wherein said limit timer means starts the operation with respect to at least one of warning and a heat control of said heating means by said scorch prevention determining means such that said heating control means causes said heating means to stop heating means to stop heating when a temperature signal from said temperature detection means fails to drop by a predetermined value within a predetermined period subsequent to a start of said operation, and cancel measuring the time by said limit time means when said temperature signal from said temperature detection means drops by a predetermined value within said predetermined period.

17. A method for controlling a heating of a heating apparatus comprising: a heating means for heating a vessel containing cooking material to be cooked; a temperature detecting means for detecting the temperature of said vessel: and
 a heating control means, operable in response to a signal from said temperature detecting means, for controlling a heating power generated by said heating means, said method comprising the steps of:
detecting a temperature rise characteristic of said vessel by means of said temperature detecting means subsequent to a start of heating and also determining, in a first temperature region of said temperature rise characteristic, the quantity of said cooking material;
determining the content of said cooking material ina second temperature region of said temperature increase characteristic which is higher than said first temperature region; and
controlling the heating power of said heating means according to both a result of the determination of the quantity of said cooking material and a result of the determination of the content of said cooking material.

18. A heating control method as claimed in claim 17, further comprising the step of scorch prevention determining, wherein at least one of warning and a heat control of said heating means is effected in the event that a temperature signal from said temperature detecting means attains a temperature higher by a predetermined value than a boiling temperature of said cooking material.

19. A heating control method as claimed in claim 17, wherein said heating apparatus further comprises limit timer means for starting measuring the time when a signal from said temperature detection means attains a temperature higher by a predetermined value than a boiling temperature of said cooking material, further comprising the step of causing said heating means to stop heating after a predetermined period subsequent to a start of measuring the time by said limit timer means.

* * * * *